Figure 7:
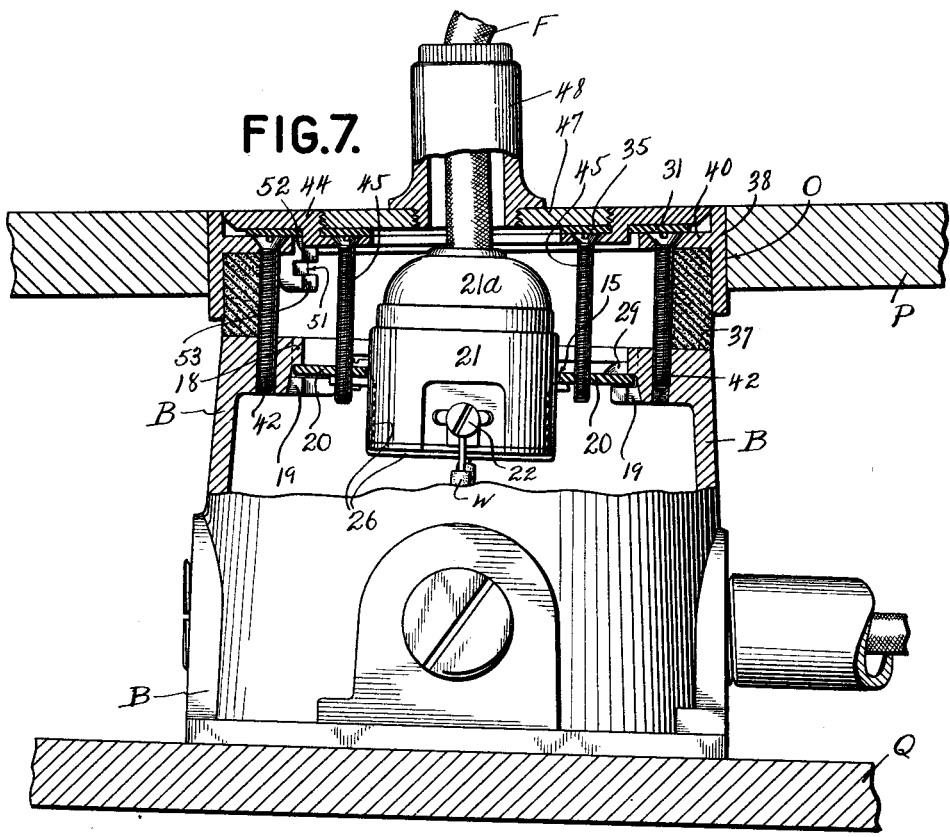

Aug. 2, 1932.  S. N. BUCHANAN  1,869,841
FLOOR BOX
Filed Dec. 17, 1928  4 Sheets-Sheet 1
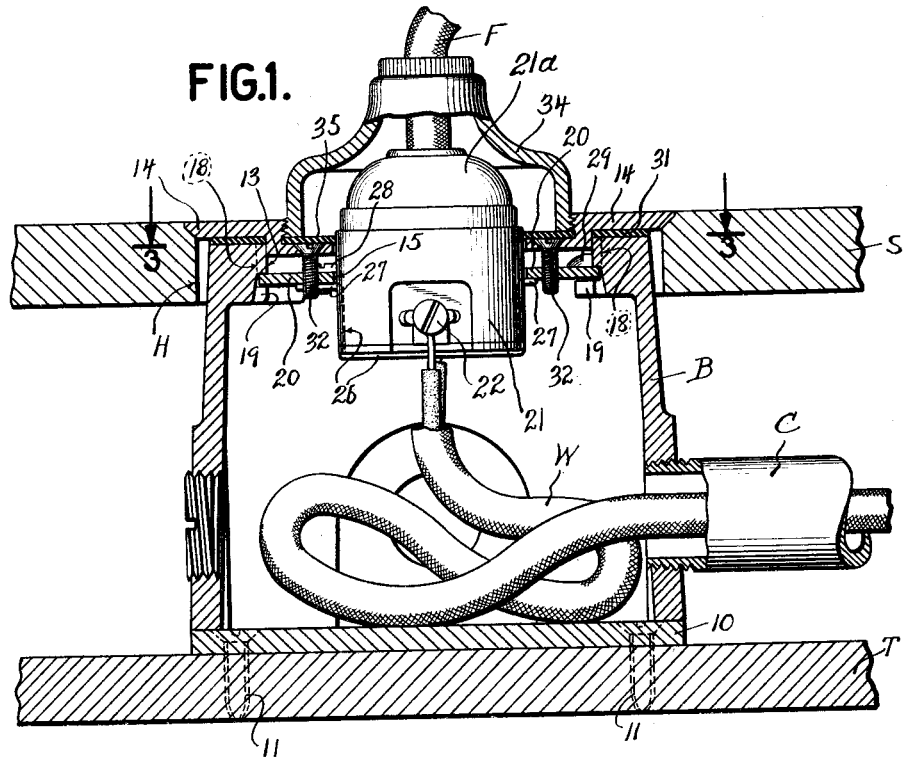
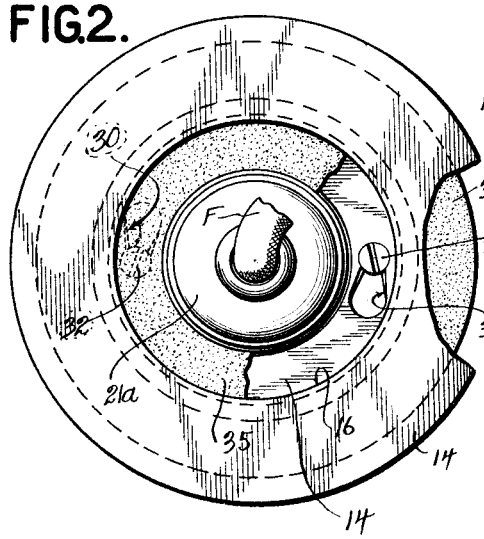
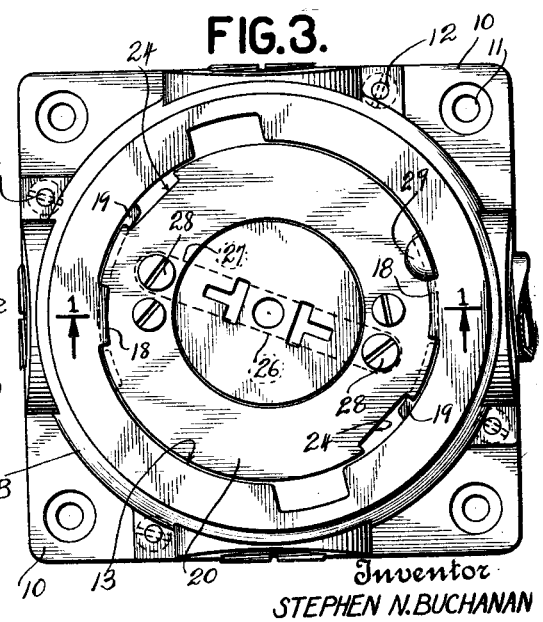
Inventor
STEPHEN N. BUCHANAN
By his Attorneys
Bohleber & Ledbetter

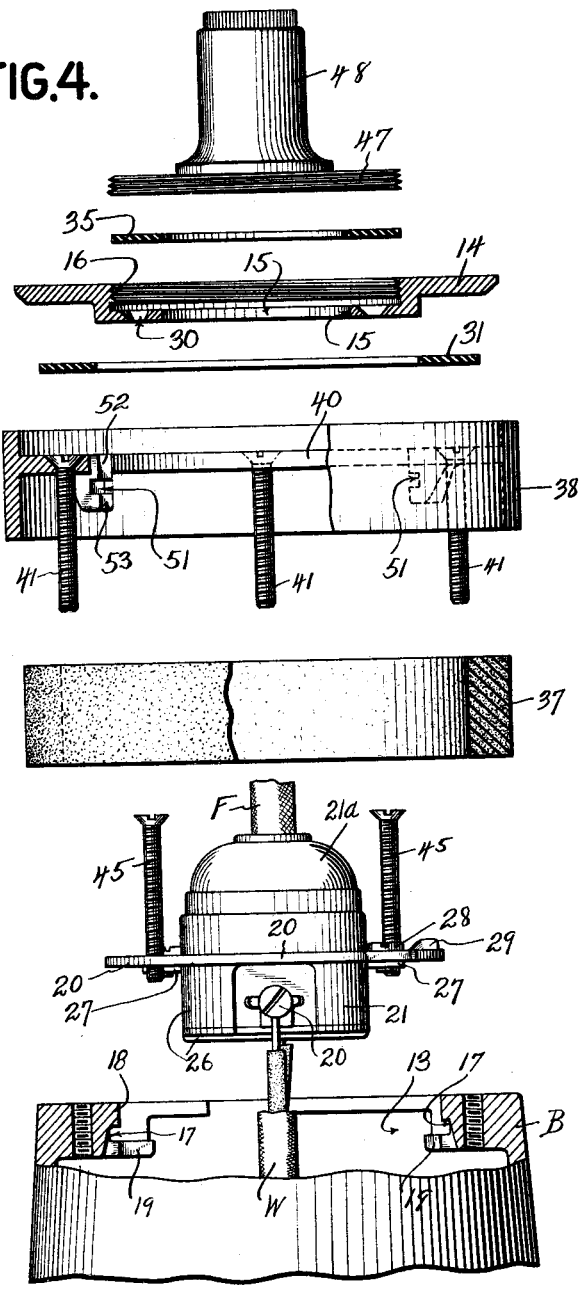

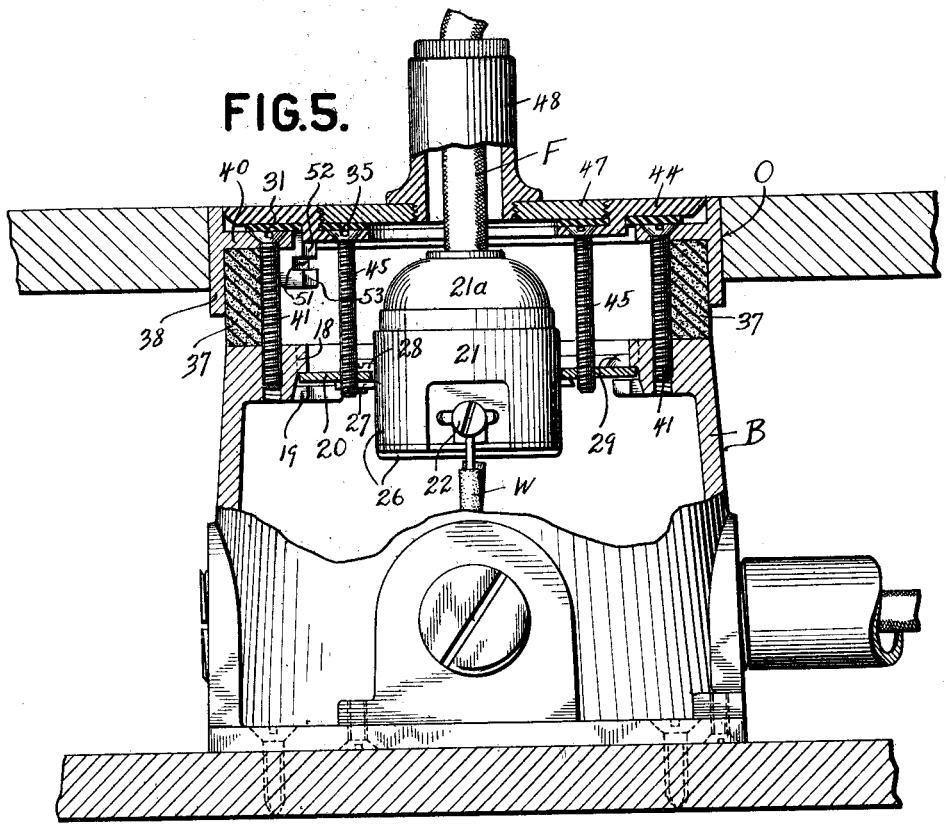
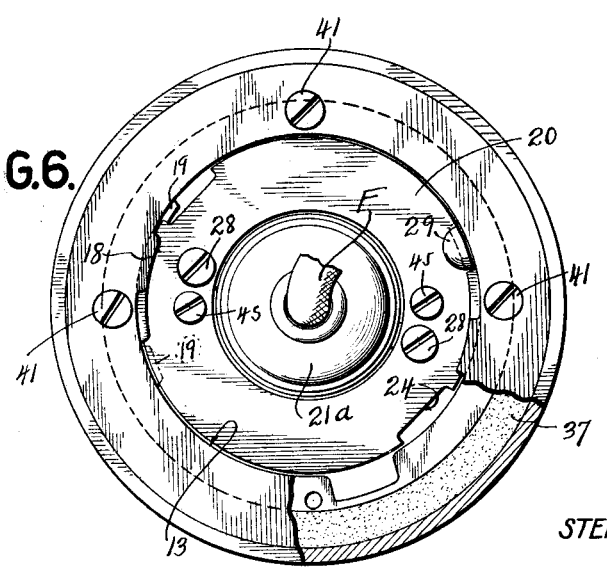

Aug. 2, 1932.    S. N. BUCHANAN    1,869,841
FLOOR BOX
Filed Dec. 17, 1928    4 Sheets-Sheet 4

Inventor
STEPHEN N. BUCHANAN
By his Attorneys

Patented Aug. 2, 1932

1,869,841

UNITED STATES PATENT OFFICE

STEPHEN N. BUCHANAN, OF ELIZABETH, NEW JERSEY, ASSIGNOR TO THE THOMAS & BETTS CO., OF ELIZABETH, NEW JERSEY, A CORPORATION OF NEW JERSEY

FLOOR BOX

Application filed December 17, 1928. Serial No. 326,512.

This invention relates to electrical outlet fittings such as floor boxes and the like.

A main object is to produce a fitting which makes a positive electrical ground connection between the wires received into the fitting and the box itself to render safe the wiring installations and to carry off stray potential or short circuits thru the conduits to the ground.

A further object is to improve the general structural organization of electrical floor boxes with particular reference to floor outlets and to make the box waterproof, to adjust and level the fitting to the floor, and make the box adjustable as to its length or height so that its installation is facilitated.

In the accompanying drawings there are shown examples of the invention comprising a simple box which is nonadjustable as to height and levelling means to fit it flush to the floor surface, and comprising attachments used with the box to make it adjustable to level up the fitting to the floor surface.

Figures 1, 2 and 3 show the non-adjustable box which is installed on a level sill or support and hence levelling means are not required. Figure 1 is a vertical section and showing a conduit leading the service wires into the box and showing the flexible braided wire extending out thru the top of the box for connection with such electrical fixtures as may be required. Figure 2 is a top view with the braided-wire nozzle-bushing cover removed exposing the electrical receptacle and plug cap thereunder. Figure 3 is a view on the line 3—3 of Figure 1 showing the plug cap on the end of the braided wire removed which leaves exposed the receptacle slots in the electrical receptacle and showing a top view of the ring-like receptacle-carrying plate and showing the cooperating or lug restraining means for attaching the plate to the box.

Figure 4 is an elevational exploded view with all the parts shown in spaced relation and in their order of assembly to make both the adjustable or non-adjustable box. To make the non-adjustable box of Figure 1, the compressible gasket 37 and engaging rim 38 are omitted. Otherwise the parts are the same for both boxes.

Figures 5 and 6 show the fitting with box-lengthening and levelling-means attachments assembled therewith. Figure 5 is a partial vertical section of the box installed on a level sill or support but the support is too low so the box is not sufficiently long and hence the box-lengthening means is attached to build the box up to a position flush with the floor surface. Figure 6 is a plan view but with the box cover removed.

Figure 8:
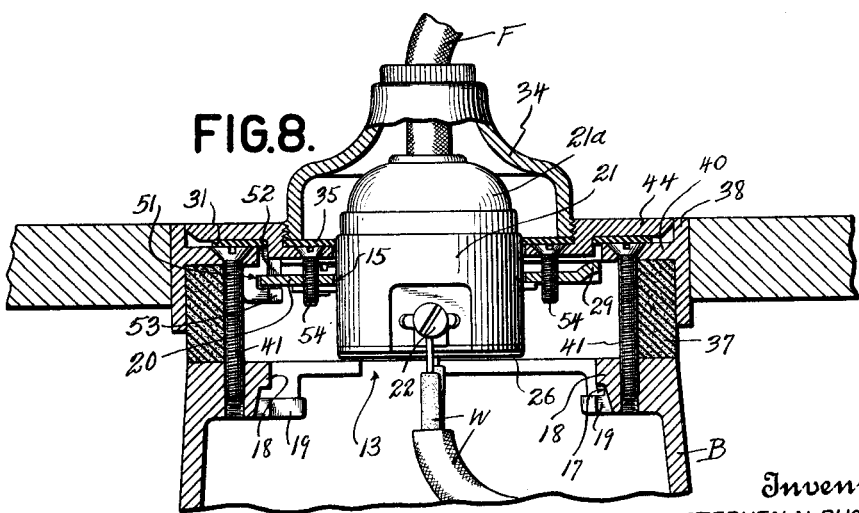

Figures 7 and 8 also shown the box-lengthening attachments in use as a means to level up the box with the floor, especially when the box is not level itself as shown in Figure 7.

Figure 8 shows an alternate position for a receptacle-carrying plate wherein the plate is mounted in retaining lugs found on the box-lengthening attachments and hence the electrical receptacle is supported in a higher position in the box. On the other hand, Figures 5 and 7 show the receptacle holding plate attached to retaining lugs formed on the box. Hence the receptacle is mounted lower in the box. The lengthening-and-levelling fittings afford a variety of box assemblies so that all adverse conditions encountered may be overcome to quickly build up a level box assembly.

The main outlet fitting itself comprises a hollow box structure B to which is connected conduits or cables C through which feed wires W are led into the box and the wires are connected with an electrical plug receptacle 21—21a to which is connected the braided flexible cord F in the usual manner. The box or box member B is installed in the floor S and the upper open end of the box may extend into the opening H formed in the floor. The box B is usually anchored to a beam or sill support T by screws 11 or other suitable means.

The box or box member B may to advantage be made substantially circular in shape and is closed at the bottom by a plate 10. The bottom 10 of the box is usually screw fastened, as at 12, to the bottom box B and anchorage screws 11 may be inserted through the bottom cover plate 10 and fastened into the timber T to hold the box B in position and alignment with the opening H in the floor S. The upper open end of the box is indicated at 13 and this opening is preferably circular and is closed by a cover plate 14 which closely fits the floor opening H. The cover 14 is made with an opening 15 through which the flexible braided cord F and the electrical receptacle 21—21a is inserted. The cover 14 is also made with an internal screw threaded opening 16 for the reception of a wire bushing nozzle as later mentioned.

Retaining lugs 18 and 19 are integrally formed with the box B within its opening 13 and overhanging or extending therein for the purpose of receiving and holding a receptacle-carrying plate 20 which is made in the form of a ring so as to receive thereinto the electrical receptacle 21 to which the wires W are electrically connected at 22. The oppositely disposed lugs 18—19 are formed of upper 18 and lower portions 19. Each lug means 18 and 19 comprises a retaining means to receive the periphery of the receptacle carrying plate 20. There is preferably provided two retaining lugs 18—19 and they are ordinarily disposed in diametrically opposite relation to each other within the box opening 13. The upper lugs 18 are in a plane spaced above and parallel to the plane of the lower lug 19. The oppositely disposed sets of retaining lugs 18—19 provides a positive supporting means to hold the plate 20 in position. Furthermore, the lugs 18—19 make a positive electrical ground connection with the receptacle-carrying plate 20 as will further appear.

The upper and lower lug portions 18 and 19 include therebetween a groove 17. This groove 17 is formed in each of the oppositely disposed sets of retaining lugs. The groove 17 is defined by the parallel edges of the upper 18 and lower lug portions 19. Therefore there is provided oppositely the disposed grooves 17 which are in the nature of bayonet slots for the reception of the receptacle carrying plate 20 heretofore mentioned and which has cooperating notches 24 which enables the plate 20 to be anchored in the slots 17.

The receptacle plate 20 has a circular periphery so as to fit into the circular box opening 13 and the notches 24 are formed in the periphery of the receptacle plate 20. The notches 24 are preferably arranged in diametrically opposite relation so as to register with the upper lug portions 18. The notches 24 are designed to fit over and pass beyond the upper box lug portions 18 which enables the mechanic to place the receptacle plate 20 down within the box opening 13 by moving the notches 24 downwardly past the upper lug portions 18 whereupon the mechanic turns the receptacle plate 20 so as to move the notches 24 out of registry with the upper lugs 18 in order to interlock the plate 20 within the two sets of retaining lugs 18—19 and within the oppositely disposed bayonet slot connections 17.

The receptacle-carrying plate 20 receives the electrical receptacle 21 and a strap 26 wraps around the bottom of the receptacle 21 and has its upper ends 27 fastened by screws 28 or other means to the plate 20. The strap 26 is shown in dotted lines in Figure 3. The receptacle plate 20 is inserted in its bayonet and slot connections 17 and the workman holds on to the receptacle 21 and manipulates the plate 20 down through the opening 13 and by moving the plate notches 24 past the upper lugs 18 and by then rotating the plate 20 say to the right until a stop boss 29 comes to rest against the end of one lug 18, the receptacle plate is anchored in position.

A stop boss 29 and one of the lugs 18 provides a limit of rotation for the receptacle plate 20 so as to positively stop it in a position where the notches 24 are out of registry with the upper lugs 18. It then follows that an upward strain exerted on the plate 20 by screws 32 cause the plate 20 to be tightened in its bayonet-and-slot connection, said tightening or clamping action occurring between the upper surface of the plate 20 and the lower surface of the upper lug portions 18. This tightening and clamping action provides a positive electrical ground connection between the box B and the plate 20 which renders the installation safe because any stray potential from wire W or F is grounded thru the conduits C to the ground which are always grounded as is known in the art.

It is desirable to mount a gasket 31 on the upper rim of the box B whereupon the cover plate 14 is mounted over the box and screws 32 which are loosely carried in the plate 14, are screw threaded into the receptacle-carrying plate 20. The screws 32 act to draw downwardly the cover plate 14 to seal against the gasket 31 and exerts an upward force on the receptacle plate 20 which binds it against the lower edges of the upper lugs 18 in the slots or grooves 17 to make a positive ground connection between the box and receptacle carrying plate 20.

A wire bushing nozzle in the form of a finishing cover 34 is screw fastened into the threaded opening 16 in the box cover 14. It is desirable to first place a gasket 35 in the cover plate 14 whereupon the nozzle 34 is screwed down against the gasket. The two gaskets 31 and 35 securely seal the upper opening 13 of the box and make a water tight joint. The braided electrical cord F is led upwardly through the bushing nozzle 34 to an electric light or any other fixture which is supplied current from a floor outlet.

The flexible cord F is connected to a removable plug cap 21a. The receptacle 21 and 21a together form the electrical outlet separable plug connection which is interposed between the feed wire W and braided cord F. The plug cap 21a and receptacle 21 are standard type and the separable plug cap 21a may be pulled from the electrical socket 21 and thus the cord F may be entirely disconnected from the floor box by unscrewing the nozzle 34 and then withdrawing the cord F and plug cap 21a from the receptacle 21.

The foregoing description covers the simple type of box outlet structure shown in Figures 1 through 4, although there is illustrated in Figure 4 a box lengthening-and-levelling means to adjust the fitting flush to and level with the upper surface of the floor S. A description will now be given of the latter mentioned fittings which are applied to the box structure B and accessory parts already described and hence the description will not be repeated in detail as to the box and lug construction.

Referring now to Figures 5 through 8, there is shown box-extending or lengthening means which includes the compressible gasket 37 and the gasket engaging rim or flanged ring 38. These two parts are in Figure 4 which shows all the parts in spaced relation required for constructing that type of floor outlet shown in Figures 5 through 7 as well as in Figures 1 through 3. In other words, Figures 5 through 8 simply show the gasket 37 and rim 38 mounted on that box already described in Figures 1 through 3. Therefore the box structure in Figures 5 through 8 have the same references applied thereto as in Figures 1 through 3. The rim 38, with or without the sealing gasket 31, and a flange for engaging a leveling means form a rim member.

The purpose of the box levelling means 37 and 38 is to adjust the floor fitting to the surface of the floor so as to make a flush finish in a floor opening O formed in the floor P above a timber or sill bracket Q which has been carelessly nailed in place under the floor P to such an extent that it is found impossible to mount the box B so that its upper edge will lie flush and form a smooth finish with the floor as illustrated in Figure 1. Under these adverse conditions, the levelling and box-lengthening means are used. In other words the box extending and levelling means 37 and 38 are adapted to be used with the box B when the latter is anchored to a support Q which is crooked and out of alignment and thus presents a more difficult box installation than shown in Figures 1, 2 and 3 where the box supporting member T is well laid out in parallel relation to the floor S as well as the exact depth therefrom which is nearly impossible to do.

The compressible gasket 37 is substantially equal in size to the diameter of the box B and is placed on the upper edge thereof. The gasket engaging or compressing member 38 fits in the floor opening hole O and rests on top of compressible gasket 37. The gasket engaging rim 38 is made with an inside flange 40 which rests on top of the gasket 37 and the rim 38 engages the outer cylindrical surface of the gasket. The inside flange 40 carries screws 41 which may fit closely to the gasket 37. The lower end of the screws are engaged and screw threaded into tapped holes 42 made in the upper flanged edge of the box B. Usually two oppositely disposed screws 41 are sufficient to adjust the gasket engaging rim 38 flush to the upper surface of the floor P.

Since the box B is anchored to a support Q which is out of alignment with the floor P, it follows that the longitudinal axis of the box B is not at right angles to the plane of the floor P and for that reason the gasket and rim levelling means 37—38 is employed and after said levelling means are inserted through the floor hole O the screws 41 are adjusted in such a way as to compress one side of the gasket more than the other as shown in Figure 7, whereupon the ring 38 is brought into a level and flush position with the floor P. After the foregoing levelling-up has been effected by proper manipulation of the screws 41, a box cover 44 is mounted in position against the upper ends or heads of the screws 41 and the rim 38.

Since the screws 41 are loosely mounted in the flange 40 it follows that the flange and rim member 38—40 will not rigidly support the box cover 44 but the screws 41 do so. In other words, the screws 41 act as support posts on which rest the cover 44 and related parts. The cover 44 is similar to the cover plate 14 heretofore described although long screws 45 are necessarily provided in Figures 5, 6 and 7 in order to reach the receptacle carrying plate 20 which is much further below the surface of the floor P in the case of the crooked support Q than in Figure 1. The screws 45 are loosely carried in the cover 44 and screw threaded into the plate 20 with the result that the plate 20 is drawn upwardly against the upper lug portions 18 and the cover 44 is drawn tightly down against the screws 41. The screws 41 act as a rigid support to withstand the pressure exerted by the cover 44 and to carry any load which may rest on the cover 40.

The box cover 44 is closed by an adapter ring 47 into which is screwed a small size nozzle bushing 48 which is preferably used when the receptacle plate 20 is carried in the box lugs 18 and 19. Flexible braided wire F connects with the plug cap 21a which is plugged into a receptacle fitting 21 in the same manner as heretofore described in the Figure 1 installation.

Referring to Figure 8, the structure is quite similar to that already described in Figure 7 except that the Figure 8 assembly is so constructed and arranged that the mechanic is required to use the large size nozzle bushing 34 heretofore described in connection with Figure 1. This interchangeability of parts and adaptation of the nozzle bushing 48 in one instance (Figure 7) and large sized nozzle bushing 34 in another instance (Figure 8) is brought about by reason of the fact that the invention includes retaining means for mounting the receptacle-carrying plate 20 in the gasket engaging member 38—40 in the same efficacious manner as the receptacle is mounted in the box B.

A description has already been given of the manner in which the receptacle-carrying plate 20 is attached to the box B through the bayonet and slot grooves 17 in the box and the notches 24 in the plate 20. A similar structural arrangement is provided in the gasket engaging member 38 for attaching the receptacle carrying plate 20 to said member 38 which assembly is shown in Figure 8 for it is observed that the electric receptacle 21 is not placed in the box B in Figure 8 but is carried somewhat above the opening 13 of the box B.

To the above ends the gasket engaging member 38—40 is provided with slot-and-groove means 51 which depend from the flange 40. The bayonet and slot groove 51 is defined by an upper lug 52 and a lower lug 53. There are provided two oppositely disposed lug means 52—53 and they are oppositely disposed. The upper lugs 52 are caused to register with the notches 24 in the plate 20 so as to permit the plate 20 to move downwardly past the upper lugs 52 into resting engagement on the lower lugs 53 whereupon the plate 20 is rotated so that its notches 24 will be out of registry with the upper lugs 52. Thereafter the box cover 44 is placed within the ring 38 and short screws 54 draws upwardly on the receptacle carrying plate 20 and draws downwardly against the cover 44 which secures the latter against the upper ends of the screw 41. In the way the receptacle 21 and plug cap 21a are mounted high in the fitting, i. e., above the box B and the large sized nozzle bushing 34 is used by omitting the adapter ring 47 heretofore described in connection with Figure 7. The feed wires W transmit current through the receptacle outlet 21—21a to the flexible braided cord F and the assembly is complete.

In case of extreme displacement of the box support Q out of parallel relation to the floor, the plug receptacle 21 may be mounted above the box if the latter is too far displaced from an upright position. The parts and fittings provided permit all situations to be met and overcome and this floor box fills many requirements not heretofore realized. Especially is it true that a positive ground connection is effected between the wiring and box and thru the plate 20 no matter in which position it is placed.

In order to facilitate insertion of the cover plate screws 32, 45 and 54 thru the cover plate 14 or 44, I may prefer to slot the cover plate as at 30 so as to permit rotary motion of the receptacle-carrying plate 20 in relation to the cover. The slots 30 may be enlarged at one end so as to introduce the screw head thru the cover without removing the screws from the plate 20. In this way the box cover and the plate will turn in relation to each other which enables the mechanic to quickly assemble the box parts.

What I claim is:

1. In an outlet fitting, a box having an opening and a cover therefor, a plate mounted in the opening under the cover, means to carry an electrical receptacle upon the plate, lugs formed on the box in the opening under the cover, said lugs having surfaces formed in spaced parallel planes and between which the plate is disposed, and screws carried loosely in the cover and engaging the plate to lift the latter against the lugs to make a positive electrical ground connection between the box and plate.

2. In an outlet fitting, a box having an opening and a cover therefor, lugs formed in the box opening under the cover and including oppositely disposed projections which overhang the box margin defining the opening and having surfaces formed in spaced parallel planes, a ring-like receptacle-carrying plate having an outer diameter which fits into the opening and having oppositely formed notches which pass over the lugs whereby the plate is set into place between the spaced parallel surfaces, receptacle anchorage means upon the plate, an electrical receptacle anchored in the plate, screws reaching from the cover to the plate and drawing the plate toward the cover to make grounding contact between the box and plate.

3. In an outlet fitting, a box having an opening and a cover therefor, lugs formed in the box opening under the cover and including oppositely disposed projections which overhang the box margin defining the opening and having surfaces formed in spaced parallel planes, a ring-like receptacle-carrying plate having an outer diameter which fits into the opening and having oppositely formed notches which pass over the lugs whereby the plate is set into place between the spaced parallel surfaces, an electrical receptacle mounted within the ring-like plate and a strap having its ends anchored to the plate and its center portion being wrapped about the receptacle to anchor the latter to said plate, screws reaching from the cover to the plate and drawing the plate toward the cover to make grounding contact between the box and plate.

4. In an outlet fitting, a box having an opening and a cover therefor, a plate mounted in the opening under the cover, means to carry an electrical receptacle upon said plate, lugs formed on the box in the opening under the cover, said lugs having surfaces formed in spaced parallel planes and between which the plate is disposed, a compressible ring-like gasket interposed between the box and cover, and screws sufficiently long to reach through the ring-like gasket and being freely retained in the cover and engaging the plate whereby the plate is forced upwardly against the lugs to make grounding contact.

5. In an outlet fitting, a box having an opening and a cover therefor, a plate mounted in the opening under the cover, means to carry an electrical receptacle upon the plate, lugs formed on the box in the opening under the cover, said lugs having surfaces formed in spaced parallel planes and between which the plate is disposed, a compressible ring-like gasket interposed between the box and cover, a metallic ring encircling the gasket, an internal flange formed within the metallic ring and interposed between the gasket and the cover, screws mounted through the flange and engaging the box to compress the gasket and level up the metallic ring with the floor, and screws carried in the cover and engaging the plate to force the latter against the lugs.

6. In an outlet fitting, a box having an opening and a cover therefor, a plate mounted in the opening under the cover, means to carry an electrical receptacle upon the plate, lugs formed on the box in the opening under the cover, said lugs having surfaces formed in spaced parallel planes and between which the plate is disposed, said plate being provided with notches which register with and pass over the lugs so the plate may be set into position between the lugs aforesaid and rotatably confined therein, a stop boss formed on the plate and adapted to engage one of the lugs when the plate is rotated into final and locked position behind the lugs, and screws carried loosely in the cover and engaging the plate to lift the latter against the lugs to make a positive electrical ground connection between the box and plate.

7. In an outlet fitting, a box having an open upper end and closed lower end, lugs integrally formed with the box and disposed near the opening and including upper and lower lug portions, a receptacle-carrying member substantially equal in size to the box opening and placed therein and having notches in its periphery which pass over the upper lug portions and permits the member to rest on the lower lug portions and the member being rotatably confined between the upper and lower lug portions whereby the member is interlocked in the box opening, receptacle anchorage means upon the member, a box cover mounted over the member to close the opening, and screws loosely carried in the cover and engaging the member and adapted when tightened to draw the member up against the upper lug portions and pull the box cover toward the box.

8. In an outlet fitting, a box having an open upper end and closed lower end, lugs integrally formed with the box and disposed near the opening and including upper and lower lug portions, a receptacle-carrying member substantially equal in size to the box opening and placed therein and having notches in its periphery which pass over the upper lug portions and permits the member to rest on the lower lug portions and the member being rotatably confined between the upper and lower lug portions whereby the member is interlocked in the box opening, receptacle anchorage means upon the member, a box cover mounted over the member to close the opening, screws loosely carried in the cover and engaging the member and adapted when tightened to draw the member up against the upper lug portions and pull the box cover toward the box; and box cover leveling means including a compressible gasket adapted to be interposed between the upper box edge and the cover, a rim adapted to fit into a floor opening and receive the gasket therein, a flange integrally formed within the rim and resting against the end of the gasket and under the cover, and screws loosely carried in the flange and extending through the gasket and threaded into the box to draw the rim and flange toward the box and compress the gasket and level up the rim and cover with the floor and to act as a rigid support on which the box cover rests.

9. In an outlet fitting, a box adapted to receive conduit and wiring, a cover therefor, and box cover leveling means including a compressible gasket adapted to be interposed between the upper box edge and the cover, a rim adapted to fit into a floor opening and receive the gasket therein, a flange integrally formed within the rim and resting against the end of the gasket and under the cover, screws loosely carried in the flange and extending through the gasket and threaded into the box to draw the rim and flange toward the box and compress the gasket and level up the rim and cover with the floor and to act as a rigid support on which the box cover rests, screws loosely mounted through the cover, a receptacle plate and means removably attaching it to the box, and said last named screws being threaded into the receptacle plate to tighten it in the box and draw the cover down against the flange.

10. In an outlet fitting, a box and cover therefor, a rim disposed under the cover and adapted to fit into a floor opening and including an inside flange and retaining lugs depending from the flange and the rim being spaced from the box, screws loosely carried by the flange and engaging the box, a compressible and leveling gasket placed within the space between the rim and box and compressed by the screws, a receptacle-carrying plate placed within and supported by the retaining lugs and carried by the rim, and another set of screws passed through the cover and engaging the receptacle-carrying plate to draw the cover and plate toward each other and to seat the cover against the first named screws which support the cover.

11. In an outlet fitting, a box and cover therefor, a rim disposed under the cover and adapted to fit into a floor opening and including an inside flange and retaining lugs depending from the flange and the rim being spaced from the box, screws loosely carried by the flange and engaging the box, a compressible and leveling gasket placed within the space between the rim and box and compressed by the screws, retaining lugs also included in the box, a receptacle-carrying plate mounted in one of the retaining lugs aforesaid, and another set of screws loosely carried in the cover and engaging the plate to tighten the latter in the lugs and to seat the plate against the first named screws which act as a support for the cover.

12. In an outlet fitting, a box and a circular opening at one end and a cover therefor, a set of retaining lugs integrally formed in the circular opening, a ring-like gasket mounted on the box and surrounding the circular opening, a ring placed on the gasket and screws extending through the gasket to draw the ring against the gasket to compress it, another set of retaining lugs and which are integrally formed on the ring, the two sets of retaining lugs being of similar formation and one set disposed above the other, a receptacle-carrying plate of circular formation and suitable in size to pass through the ring and be received into either set of retaining lugs, and a second set of screws passed through the cover and threaded into the plate to seat the latter against the ring and first named screws and to tighten the plate in the retaining lugs.

In testimony whereof I affix my signature.
STEPHEN N. BUCHANAN.